(12) United States Patent
Holczer

(10) Patent No.: US 9,671,219 B2
(45) Date of Patent: Jun. 6, 2017

(54) REPRODUCTION OF NANO MOVEMENTS AT A DISTANCE

(71) Applicant: Karoly Holczer, Los Angeles, CA (US)

(72) Inventor: Karoly Holczer, Los Angeles, CA (US)

(*) Notice: Subject to any disclaimer, the term of this patent is extended or adjusted under 35 U.S.C. 154(b) by 0 days.

(21) Appl. No.: 14/629,226

(22) Filed: Feb. 23, 2015

(65) Prior Publication Data

US 2015/0241278 A1  Aug. 27, 2015

Related U.S. Application Data

(60) Provisional application No. 61/966,357, filed on Feb. 22, 2014.

(51) Int. Cl.
  *G01B 11/14* (2006.01)
  *G01J 3/26* (2006.01)

(52) U.S. Cl.
  CPC .............. *G01B 11/14* (2013.01); *G01J 3/26* (2013.01)

(58) Field of Classification Search
  CPC ...... G01B 9/02; G01B 9/02057; G01B 11/14; G01J 9/0246; G01J 3/26; G01J 3/0256; G02B 26/001; G02B 5/284; G02B 6/29358; G02B 6/29395; G02F 1/21; G02F 2001/213

USPC .......................................................... 356/519
See application file for complete search history.

(56) References Cited

U.S. PATENT DOCUMENTS

| | | | | |
|---|---|---|---|---|
| 4,005,937 | A * | 2/1977 | Barrett ...................... | G01J 3/44 356/301 |
| 6,678,441 | B1 * | 1/2004 | Taylor ................ | G02B 6/12007 356/519 |
| 8,363,224 | B2 * | 1/2013 | Maity .................... | G01N 21/45 356/450 |
| 2006/0238775 | A1 * | 10/2006 | Lopushansky ......... | G01B 11/14 356/519 |
| 2014/0098371 | A1 * | 4/2014 | Sabry .................... | G01J 3/0256 356/452 |

* cited by examiner

*Primary Examiner* — Michael P Lapage
(74) *Attorney, Agent, or Firm* — Law Office of Scott C Harris Inc

(57) ABSTRACT

A purpose of this invention is allow sensors to be placed at locations as close to a region of interest as possible, i.e. a few tenths of a millimeter from a probe, the target material and each other. The invention allows the user to reproduce and actively follow these locations from a remote location and at a distance, connected with to the locations with an arbitrary length of single mode optical fiber cable, and perform the sensor functions in a controlled environment using the sensor of choice without affecting the experiment.

1 Claim, 6 Drawing Sheets

REPRODUCTION OF NANO MOVEMENTS AT A DISTANCE

This application claims priority from provisional application No. 61/966,357, filed Feb. 22, 2014, the entire contents of which are herewith incorporated by reference.

BACKGROUND OF THE INVENTION

Nanotechnolgy, encompassing imaging, measuring and manipulating matter at scales 100 nanometers and smaller requires precision control of position and of distances between probes, tools, devices and materials at a nano-scale, i.e. nano-positioning. It also requires nanopostioners and other precision mechanical systems designed to move objects over a small range (1-100 micron) with resolution down to a fraction of an atomic diameter (Santosh Devasia et. al (2007), and Alexander H. Slocum (1992)). The objective is to achieve extremely high resolution, accuracy, stability, and reproducibility with a fast response time.

The optimum solution in each application is achieved by judicious mechanical design to package the precision actuators (Neal B Hubbard et. al (2006)) and position sensors (M. Tabib-Azar and A. Garcia-Valenzuela (1995)) for active feedback control of motion. The continuous mechanical structure connecting the material to the probe/tool determining their relative position is only rendered flexible by an actuator allowing change in relative position. Along the mechanical path across the actuator a distance sensor is placed and the information provided by the sensor is fedback to the actuator to control nanomotion, i.e. relative position of the material and the nano tool over time.

In reality the system controls the distance between the end points of the sensor which can be some distance away from the probe and the material we are interested in, leaving centimeters—a short distance, but $10^7$-$10^9$ times larger than what we intend to control—of the mechanical path uncontrolled, subject of vibration and thermal expansion. In fact, the practical sizes of the sensors, the complexity of the two or three dimensional arrangement of the actuators and sensors and the required functionalities often require the sensors to be located a "safe distance" from the region of interest, leaving no other options to minimize the effect of the uncontrolled mechanical structure than the often unreliable recourse to special materials and environmental (temperature, pressure, etc.) control of the whole positioning system.

SUMMARY OF THE INVENTION

A purpose of this invention is allow the sensors to be placed at locations as close to the region of interest as possible, i.e. a few tenths of a millimeter from the probe, the target material and each other. The invention allows the user to reproduce and actively follow these locations from a remote location and at a distance, connected with an arbitrary length single mode optical fiber optics cable, and perform the sensor functions in a controlled environment using the sensor of choice without affecting the experiment.

The invention described here is for single axis position control; 2D and 3D position control could require two or three independent systems.

DESCRIPTION OF THE PREFERRED EMBODIMENTS

Figure 1:
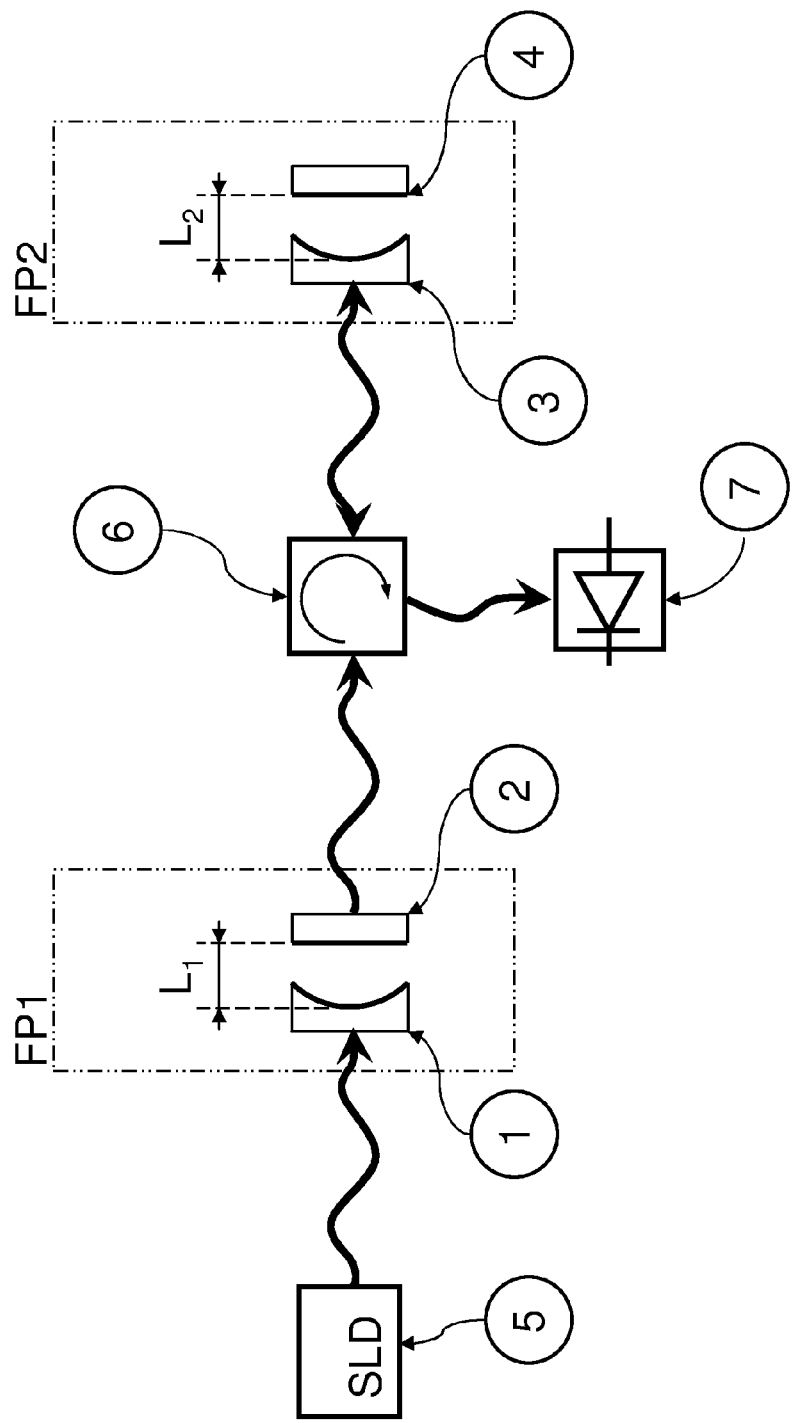
FIG. 1: Simplified illustration of the principles of reproducing nano measurements at a distance employing two identical Fabry-Perot resonators.

FIG. 1 shows a block diagram of a simplified illustration of the present invention, a device which allows nano measurements to be reproduced at a distance employing two identical Fabry-Perot resonators, FP1 and FP2. The resonators, FP1 and FP2, are formed from two highly reflecting mirrors, 1 and 2 for FP1 and 3 and 4 for FP2. As shown one of these mirrors is a convex mirror the other a plane mirror, but both mirrors could be convex mirrors. $L_1$ indicates the optical length of the Fabry-Perot resonator FP1, and $L_2$ the optical length of the Fabry-Perot resonator FP2. The method of operating the invention is based on making $L_1$ identical to $L_2$.

In FIG. 1 the light from a typical superluminescent diode 5, having a nominal wavelength of about 1300 nm, is coupled into Fabry-Perot resonator FP1. This resonator acts as a filter and only a comb of wavelengths $\lambda_n=2L_1/n$, spaced at $\Delta\lambda_n=\lambda_n-\lambda_{n+1}=2L_1/n(n+1)=\lambda_n\lambda_{n+1}/2L_1$, will be transmitted. More than 90% of the light will be reflected away from FP1.

Superluminescent diode 5, being a typical such diode, has line-width of about 30 nm. Therefore even if Fabry-Perot resonator $L_1$ is very short, say $L_1$=0.3 mm, more than 10 modes will be excited by the light, as n would be of the order of 500 and the mode separation, the Free Spectral Range, n, about 2 nm.

Figure 2:
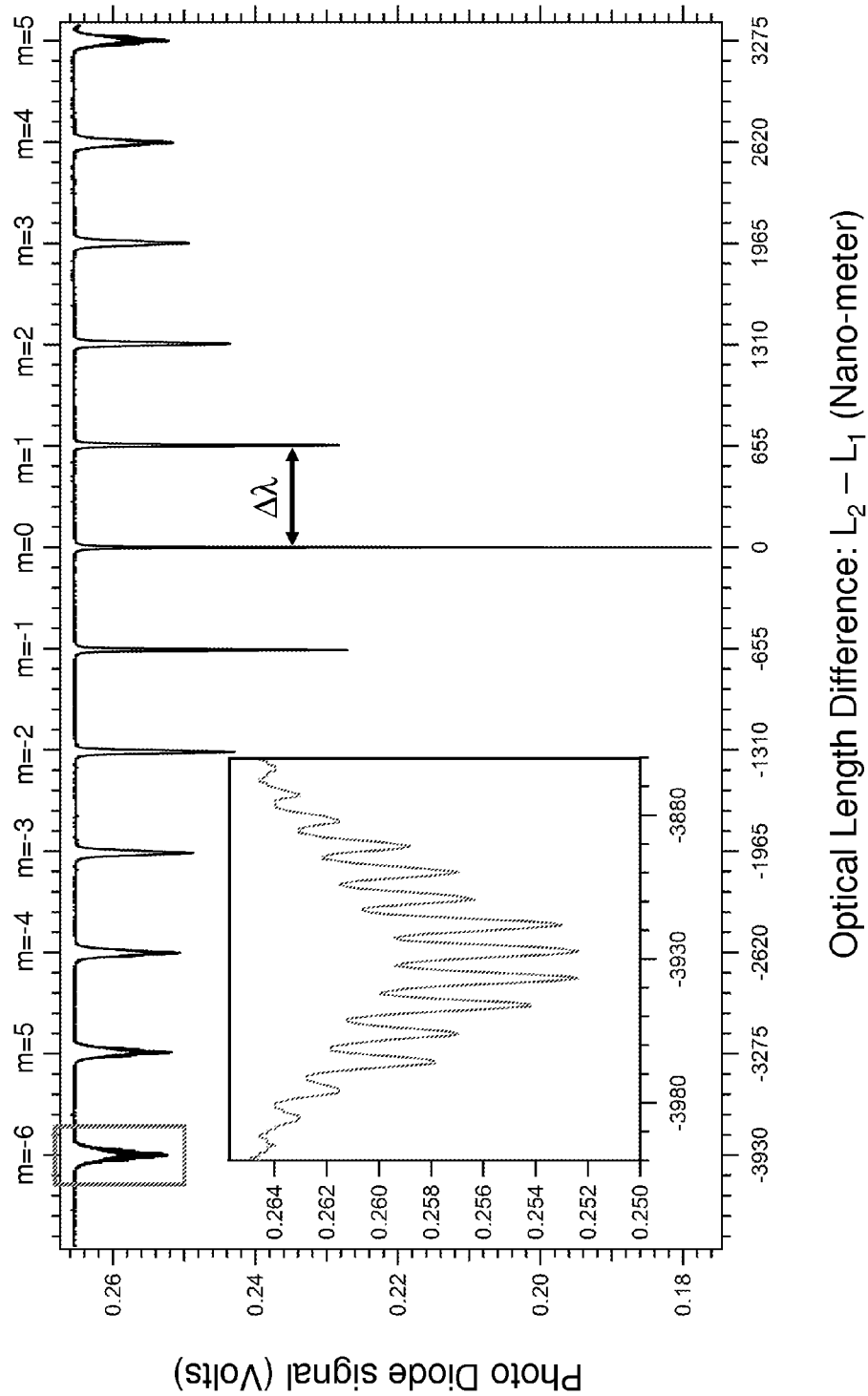
FIG. 2: Interferogramm of superluminescent light from two Fabry-Perot resonators as a function of their length difference.

The light transmitted from FP1 to FP2 is coupled into FP2 through a circulator 6, which directs the intensity of the light back-reflected from FP2 to a photodiode 7. The signal of the photodiode 7 sums the intensities of all components of the wavelength comb transmitted by Fabry-Perot resonator FP1. FIG. 2 shows the signal of photodiode 7 as a function of the differences of the optical lengths $L_2$-$L_1$ of each component of the wavelength comb, as well as the voltages of each optical length. As shown the optical length differences have a periodicity of about $\lambda/2$~655 nm. The narrowest and deepest minimum difference is observed at $L_2$-$L_1$=0, as every constituent of the wavelength comb is able to couple into the same resonant mode (same n) in FP2 as the one which selected them in FP1. Moving away from the narrowest and deepest minimum difference, minima are observed in both directions at integer multiples of $\lambda/2$, i.e. when $L_2$-$L_1$=(+/-)m*$\lambda/2$ (where m is the number of periods from the narrowest and deepest minimum difference, so that for example (+/-)m*$\lambda/2$ equals+1 times 1310 nm/2 at the first period greater than the narrowest and deepest minimum difference). However, this test can be satisfied only for one element of the wavelength comb at a time as $\Delta\lambda_n$ also depends on the value of n, $\Delta\lambda_n=2L_1/n(n+1)$, and therefore the mode separations are not identical in the two cavities, resulting in broader and less deep minima for increasing |m|. For |m|=6 the separate coupling of each individual line of the wavelength comb as a function of $L_2$-$L_1$ is clearly resolved, as shown on the enlarged scale inset of FIG. 2. It might be noted that had a white light source instead of a superluminescent diode been used, only one interference would be observed. All other minima would have disappeared; white-light interference is imperfect due to the finite width of the light source.

However, from the interference pattern observed in FIG. 2, the interference corresponding to $L_2=L_1$ is the narrowest, and it is easy to identify. Our invention uses this narrow (and deep) minimum to make the distance $L_2$ equal to the distance $L_1$, and maintain these distances identical, with sub-picometer precision.

Figure 3:
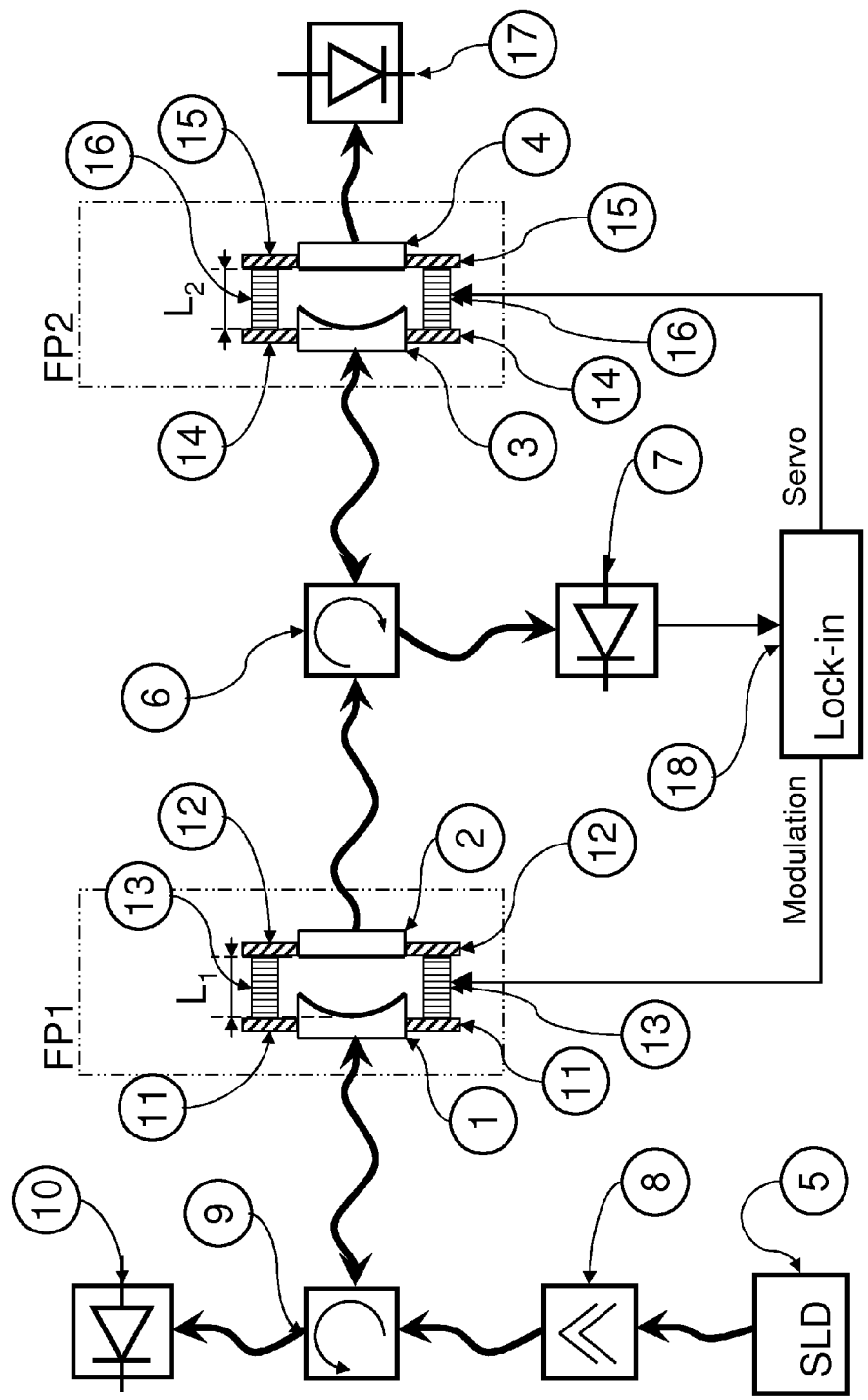
FIG. 3: Block diagram of an apparatus that reproduces nano measurements at a distance employing two Fabry-Perot resonators for small amplitude modulation.

FIG. 3 shows a block diagram of the simplest embodiment of the present invention. As shown, the embodiment employs single-mode fiber coupled components, but a similar embodiment could be assembled for any wavelength of light using free space or fiber coupling, as is practical for the situation. In FIG. 3, unlike FIG. 1, an isolator 8 and a circulator 9 are inserted between the superluminescent diode 5 and FP1. These components serve to provide a monitor signal on a photodiode 10 to facilitate adjustment of FP1. Furthermore, in FIG. 3, the mirrors 1 and 2 of FP1 are held mechanically by holder rings 11 and 12, respectively, allowing precise control of their separation by means of high precision piezoelectric actuator 13 inserted between the holder rings 11 and 12. Similarly the mirrors of FP2, 3 and 4 are held by holder rings 14 and 15, respectively, again allowing precise control of their separation by means of high precision piezoelectric actuator 16. Photodiode 17 detects the light transmitted to FP2 and helps to tune that component. Finally as with the FIG. 1 illustration, circulator 6 directs the intensity of the light back-reflected from FP2 to a photodiode 7.

Figure 4:
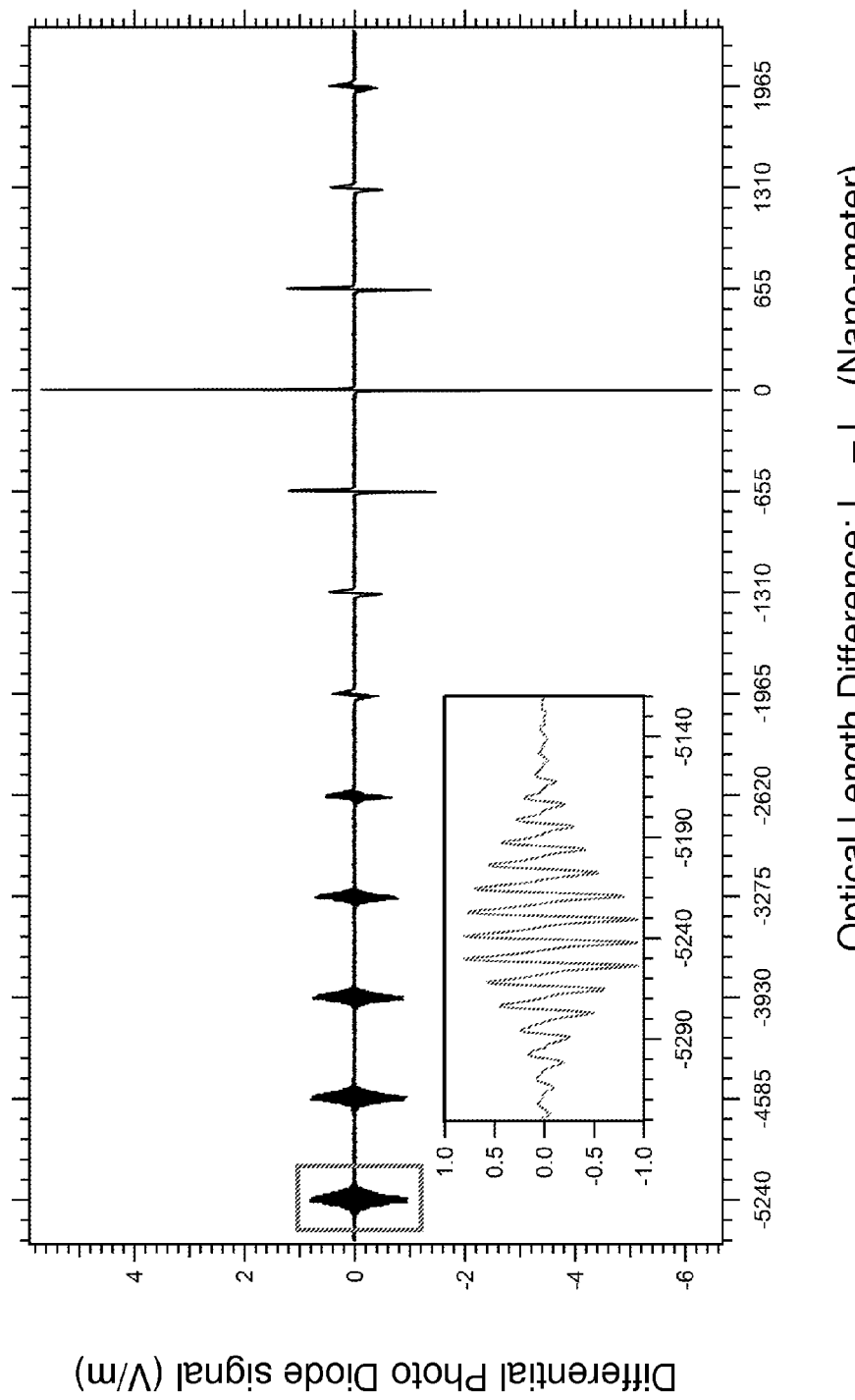
FIG. 4: Interferogramm of modulating the light from the originating Fabry-Perot resonator on the second Fabry-Perot resonator as a function of their length difference.
Figure 5:
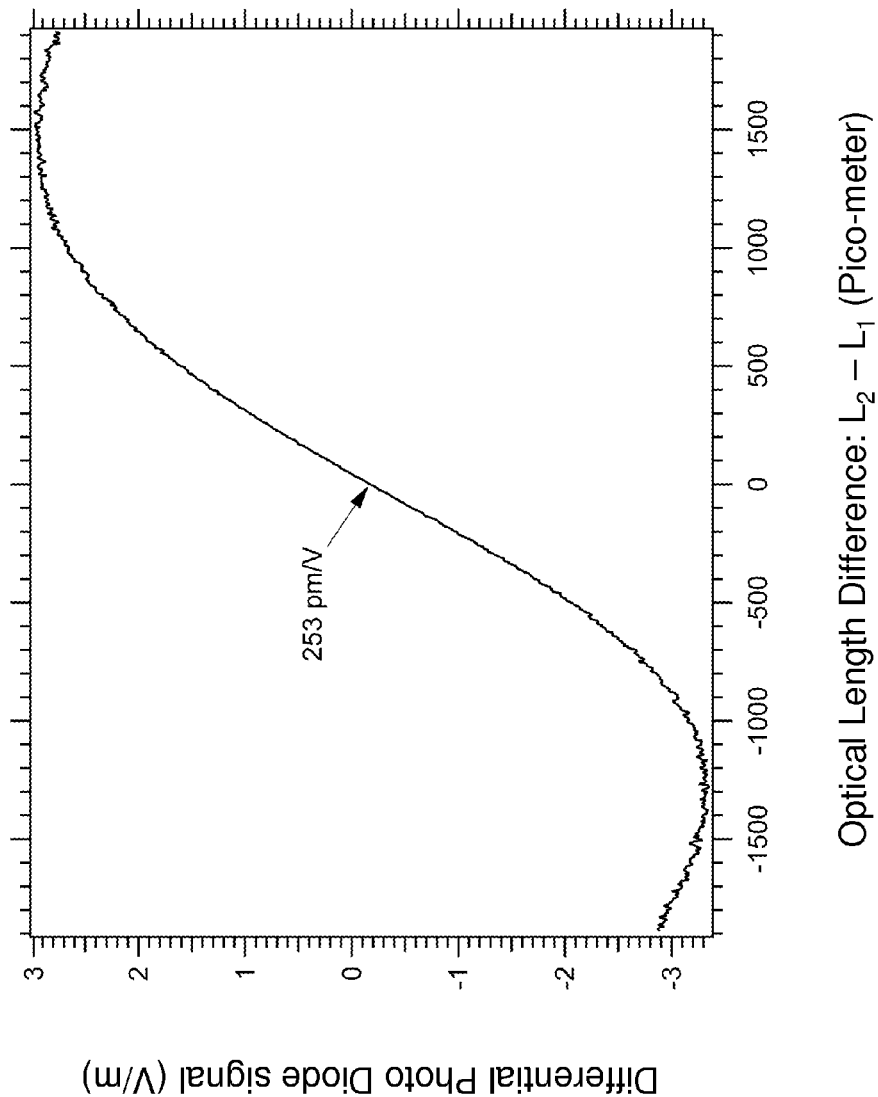
FIG. 5: Interferogramm of modulating the light from the originating Fabry-Perot resonator on the second Fabry-Perot resonator as a function of their length difference in the immediate vicinity of the point where the length of one resonator equals that of the other.

In order to lock $L_2$ to $L_1$ the wavelength comb generated by FP1 a small amplitude sine wave, ~5 kHz, is applied to piezo 13, giving a sub-angstrom amplitude modulation to the light transmitted from FP1 to FP2. The lock-in amplifier 18 connected to photodiode 7 detects the response to this modulation. The resulting 'derivative' signal as a function of $L_2$-$L_1$ over the entire ~7 micron range of piezoelectric actuator 16 is shown on FIG. 4; and over the immediate vicinity of $L_2=L_1$ is shown in FIG. 5. The 250 picometer/volt slope signal shown in FIG. 5 is fedback to piezo 16 locking and holding the FP2 resonator length to that of FP1 with an rms noise of ~3 picometers over a 1 kHz bandwidth. It will be noted that the locking range of the system is only ~2 nm, as infered from FIG. 5.

The precision achieved with the apparatus of FIG. 3 can be improved using higher Q resonators, i.e. with the use of higher reflectivity mirrors (the ones shown are R=0.98, which is consistent with the observed ~250 pm amplifier lock-in range as shown in FIG. 5 which arises from both cavities having resonant modes of about 10 MHz width). However, this technique would result in a further reduction of the lock-in range making it inconveniently small for smaller resonance widths (higher Q). Using higher frequency modulations than the resonance width, such as in a Pound-Drever-Hall laser lock-in technique, the lock-in range becomes the modulation frequncy, $f_1$=30-50 MHz, independent of the resonator qualty.

A higher precision, faster response preferred embodiment of the invention uses a generalized form of such a Pound-Drever-Hall laser lock-in scheme as shown in FIG. 7. As shown there an electro-optical phase modulator 18 is inserted between the two Fabry-Perot resonators FP1 and FP2, and driven by a $f_1$=30-50 MHz signal so that FM side-bands are generated for every line of the wavelength comb coming out of FP1. Each of these lines will lock to the identical mode of FP2, all of which reinforces the distance locking strength.

The $f_1$ modulation signal is generated by one of the channels of a dual channel direct digital synthesizer (DDS) 19, which could be an Analog Devices model AD9958 The AD9958 can generate equal frequency signals (with 32 bit resolution) on both outputs, with independently adjustable phase (14 bit/0.02° resolution) and amplitude (10 bit resolution).

The signal-of-interest from the electro-optical phase modulator 18 is carried in the photodiode 7 output at frequency $f_1$. The photodiode 7 output is filtered and connected to the RF input of the mixer 20 whose local oscillator (LO) input is connected to the second channel of the DDS 19. The programmable phase-offset between the two DDS 19 channels allows phase adjustment for optimal detection of the $f_1$ component. The low-pass filtered IF output of the mixer 20 is the PDH error signal, which is brought after appropriate gain 21 to the piezoelectric actuator 16 resulting in a broad lock-in range and sub-picometer precision reproduction of movement.

It is important to realize that the precision of the motion control as well as the range of the motion reproduced is not dependent on wavelength. The invention provides continuous operation over a range 10-1000 times the light wavelength used. The range is only limited by the actuator used and the design of the Fabry-Perot resonator.

Typically, short and compact Fabry-Perot resonator designs are preferred. The invention does not measure the distance. It reproduces distance with better precision than the measurement technology available, and putting the distance in a different location, meters away from where it started.

Figure 6:
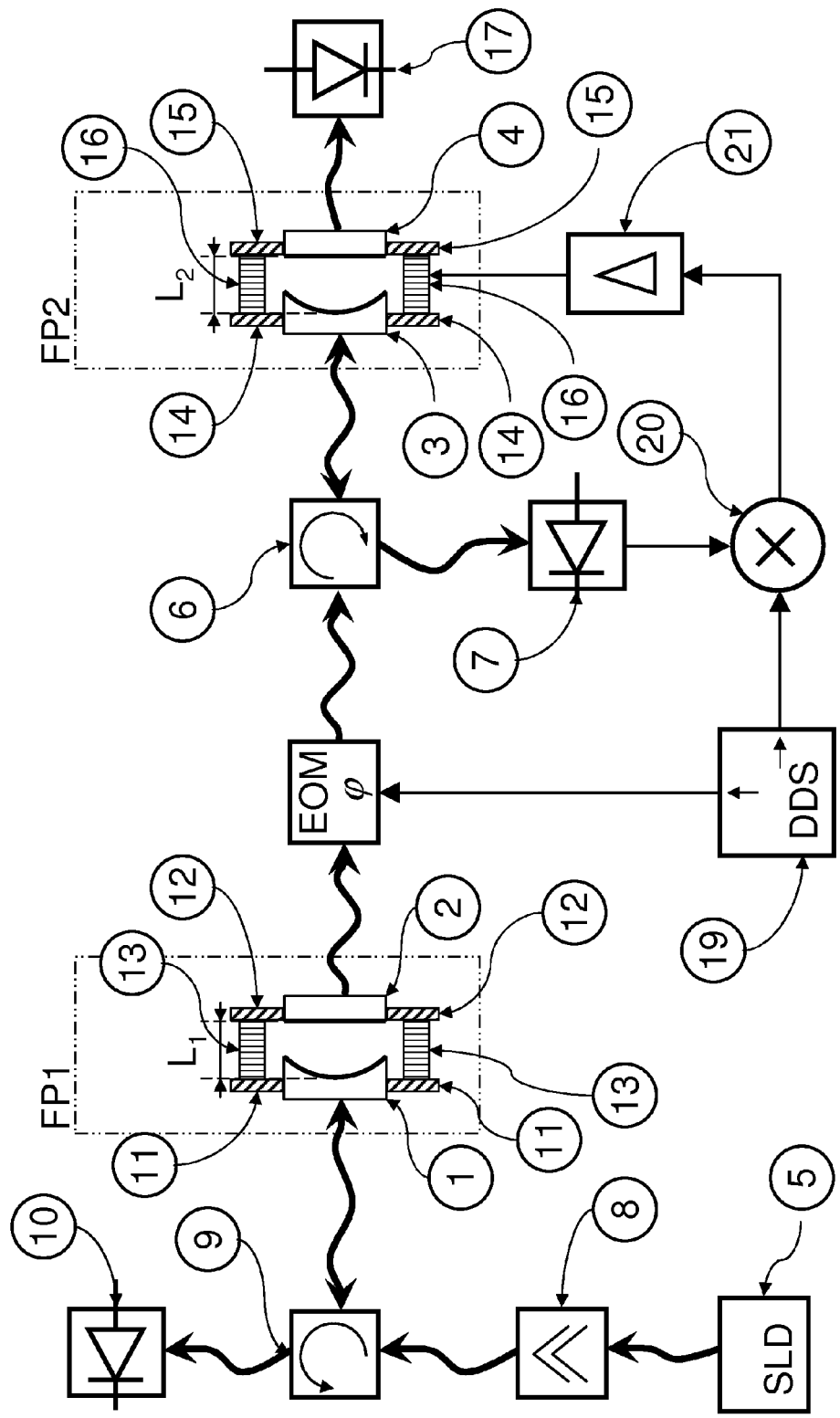
FIG. 6: Block diagram of a higher precision, faster response apparatus that reproduces nano measurements at a distance employing two Fabry-Perot resonators for small amplitude modulation and employs a Pound-Drever-Hall laser locking scheme to improve sensitivity.

The invention will perform the best when $L_1$ and $L_2$ are the shortest, i.e. an optical length less than a millimeter. It is best used to position two macroscopic objects, a probe and a sample, or a tool and a work piece, relative to each other with atomic precision. Ideally the two objects would be attached to the reference (inner) surfaces of rings 14 and 15 of FIG. 6, when the distance between the objects is minimal. Placing a precision measurement device directly between the tool/probe and its target is typically more cumbersome and adds centimeters, sometimes tens of centimeters, extra support structure between the reference surfaces and the distance between the tool/probe and the target. Even if the distance between the reference surfaces kept constant, the distance of interest is the subject of thermal variations of the supporting structure. Reducing this to a few tenth of a millimeter, as required for a well-designed miniature Fabry-Perot resonator, reduces the thermal drift in the tool/probe or target distance by two to three orders of magnitude.

While implementing FP2 in the near vicinity of the tool/probe and target imposes minimal congestion, the environment of FP1 can be created independently from the experiment. Distance is measured and controlled between the mirrors 11 and 12 of FP1 at a different location than FP2, and the two Fabry-Perot resonators are connected only with a single-mode fiber. The temperature drift of the of the distance measurement can be minimized by careful temperature and vibration control, such as enclosed, sealed, high vacuum or a UVH environments. There is no need to access this environment as measurements and sample changes happen elsewhere, at FP2.

Applications which can benefit from the use of the invention disclosed here include but are not limited to scanning probe microscopy, nano-fabrication processing, and in general any process, where the positions of two macroscopic objects should be controlled and stabilized relative to each other with atomic scale, sub-nanometer precision.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other devices, and forms of modularity, can be used.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A method of reproducing nanometer scale and smaller measurements at a distance using two identical Fabry-Perot resonators, including a first Fabry-Perot resonator operating as a measuring Fabry-Perot resonator and a second Fabry-Perot resonator operating as a reproducing Fabry-Perot resonator, each of the Fabry-Perot resonators formed from two reflecting mirrors, the method comprising making an optical length of the measuring Fabry-Perot resonator identical to an optical length of the reproducing Fabry-Perot resonator, the method comprising:

coupling light from a superluminescent diode into the measuring Fabry-Perot resonator;

coupling the light transmitted from the measuring Fabry-Perot resonator to the reproducing Fabry-Perot resonator through a circulator which directs the intensity of the light back-reflected from the reproducing Fabry-Perot resonator to a photodiode which sums the intensities of each component of a wavelength comb transmitted by the measuring Fabry-Perot resonator;

changing the optical length of the reproducing Fabry-Perot resonator while measuring the wavelength comb, and finding a narrowest and deepest voltage signal minimum of all components of said wavelength comb, and setting the optical length of the measuring Fabry-Perot resonator to be identical to the optical length of the reproducing Fabry-Perot resonator at the narrowest and deepest voltage signal minimum, locking the optical length of the measuring Fabry-Perot resonator to the optical length of the reproducing Fabry-Perot resonator.

* * * * *